United States Patent [19]
Thompson et al.

[11] 3,960,588

[45] June 1, 1976

[54] REINFORCING PIGMENTS

[75] Inventors: Thomas D. Thompson, Flemington; Robert W. Bradshaw, Hillsborough, both of N.J.

[73] Assignee: Yara Engineering Corporation, Elizabeth, N.J.

[22] Filed: Nov. 11, 1974

[21] Appl. No.: 522,522

[52] U.S. Cl. ............................ 106/288 Q; 106/72
[51] Int. Cl.² ..................... C08K 9/06; C04B 33/13
[58] Field of Search ...................... 106/288 Q, 72

[56] References Cited
UNITED STATES PATENTS

| | | | |
|---|---|---|---|
| 2,111,981 | 3/1938 | Liebetruth | 106/288 Q |
| 2,265,127 | 12/1941 | Bolton | 106/288 Q |
| 2,531,396 | 11/1950 | Carter et al. | 106/72 |
| 2,571,100 | 10/1951 | Augustin | 106/72 X |
| 2,884,402 | 4/1959 | Bachmann et al. | 106/288 Q |
| 3,080,256 | 3/1963 | Bundy | 106/72 X |
| 3,586,523 | 6/1971 | Fanselow et al. | 106/72 X |

*Primary Examiner*—Patrick P. Garvin
*Assistant Examiner*—William G. Wright
*Attorney, Agent, or Firm*—Buell, Blenko, and Ziesenheim

[57] ABSTRACT

A reinforcing pigment for elastomeric materials is provided in the form of kaolin treated with an organic acid containing functional groups such as $-NH_2$, $-SO_3H$ and $-SH$.

2 Claims, 3 Drawing Figures

REINFORCING PIGMENTS

This invention relates to reinforcing pigments and particularly to white reinforcing pigments for use in the rubber industry.

The use of reinforcing pigments, particularly in the rubber industry, is old and well known. For example, carbon black has for years been used in rubber to produce black rubber articles. In order to produce white rubber articles, various white pigments have been used including kaolin. Such white pigments have unfortunately failed to provide the necessary reinforcing comparable to carbon black.

We have discovered a novel white kaolin which does provide greatly enhanced reinforced properties in rubber. We discovered that such a rubber reinforcing kaolin can be produced by wet blending kaolin and an organic acid containing functional groups such as $-NH_2$, $-SO_3H$ or $-SH$. The wet blend of clay and acid can be spray dried or flocculated with $ZnCl_2$, filtered and dried in conventional driers. After drying, the clay product is pulverized to desired size.

We have also discovered that by controlling the amount of functional organic acid used in the kaolin-organic acid blend the reinforcing properties of the pigment can be controlled. We have also found that there is a relationship between the number of carbon atoms in the terminal amino fatty acids and the reinforcement effect obtained. In short the higher the number of carbon atoms the better the reinforcing properties. We have found that the preferred amount of organic acid to clay is about 0.4% to 4% by weight.

In order to demonstrate the operability and effectiveness of our invention we prepared kaolins using several different organic functional acids and found that in every case there resulted an improvement in the ability of the clay to reinforce rubber.

The method of preparing such kaolins is described in the following Examples:

EXAMPLE I 350 grams kaolin was dispersed with 1.40 grams ethylenediamine at 55–60% solid. The slurry was then diluted to 10% solids and 2.9g of 6-NH$_2$-Hexanoic acid was added. The slurry was heated to 70°C and held for 10 min. after which 2.6g of $ZnCl_2$ was added in order to flocculate the kaolin. The flocculated slurry was then filtered, dried, and pulverized. The important physical properties of the pigment in SBR 1502 rubber are given in Table I.

EXAMPLE II

Same procedure as in Example I with the exception that 1.7g of glycine was added instead 6-NH$_2$-Hexanoic acid.

EXAMPLE III

Same procedure as in Example I with the exception that the acid used was w-NH$_2$-Lauric acid (12.3g).

EXAMPLE IV

Same procedure as in Example I except that p-NH$_2$-Benzoic acid (3.5g) was the functional acid used.

EXAMPLE V

Same procedure as in Example I except that mercaptoacetic acid (4.0g) was used as the functional acid.

EXAMPLE VI

Same procedure as in Example I except that sulfanilic acid (3.2g) was used as the functional acid.

Table I

| | Reinforcing Properties | | | |
|---|---|---|---|---|
| | Hardness | Tensile Strength | 300% Modulus | Elongation |
| Control (no acid) | 68 | 1300 | 750 | 450 |
| Oleic Acid | 67 | 1350 | 750 | 500 |
| Example II Glycine | 70 | 1275 | 800 | 450 |
| Example IV p-NH$_2$-Benzoic Acid | 68 | 1300 | 825 | 475 |
| Example I 6-NH$_2$-Hexanoic Acid | 70 | 1300 | 825 | 450 |
| Example V Mercaptoacetic Acid | 70 | 1300 | 875 | 400 |
| Example III w-NH$_2$-Lauric Acid | 73 | 900 | 900 | 300 |
| Example VI Sulfanilic Acid | 69 | 1450 | 900 | 475 |

EXAMPLE VII

Using the same amounts of sulfanilic acid and clay, as in Example VI, the addition of $ZnCl_2$ is omitted. The clay sulfanilic acid mixture is then spray dried and pulverized. The physical properties of this pigment in SBR 1502 are identical to those of Example VI.

EXAMPLE VIII

Identical procedure to that of Example VI with the exception of the particle size of the clay. Example VI was made from a clay with a medium particle size of 0.2 microns.

| Tensile Strength | 300% Modulus | Elongation |
|---|---|---|
| Example VI 1400 PSI | 900 PSI | 450 |
| Example VIII 1600 PSI | 1000 PSI | 450 |

The reduction in tensile strength and increase in modulus of the treated clay in comparison to the control or untreated clay in the foregoing examples is indicative of the increased reactivity of the treated clay by means of increased cross link density.

In order to more graphically show the effectiveness of our invention we have illustrated the various changes in physical properties in the accompanying drawings in which.

Figure 1:
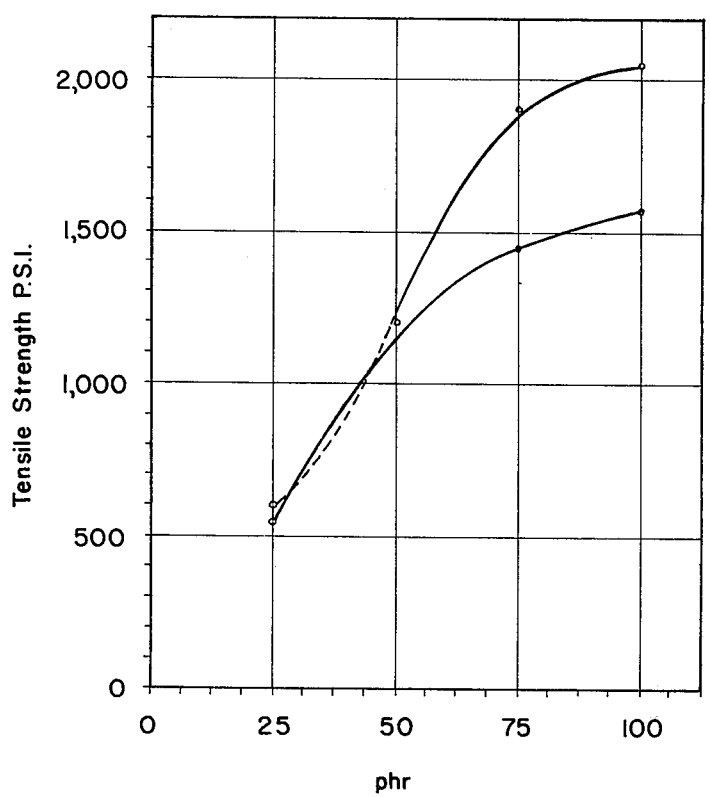
FIG. 1 is a graph of tensile strength of an untreated clay compared to a clay treated with sulfanilic acid according to our invention.
Figure 2:
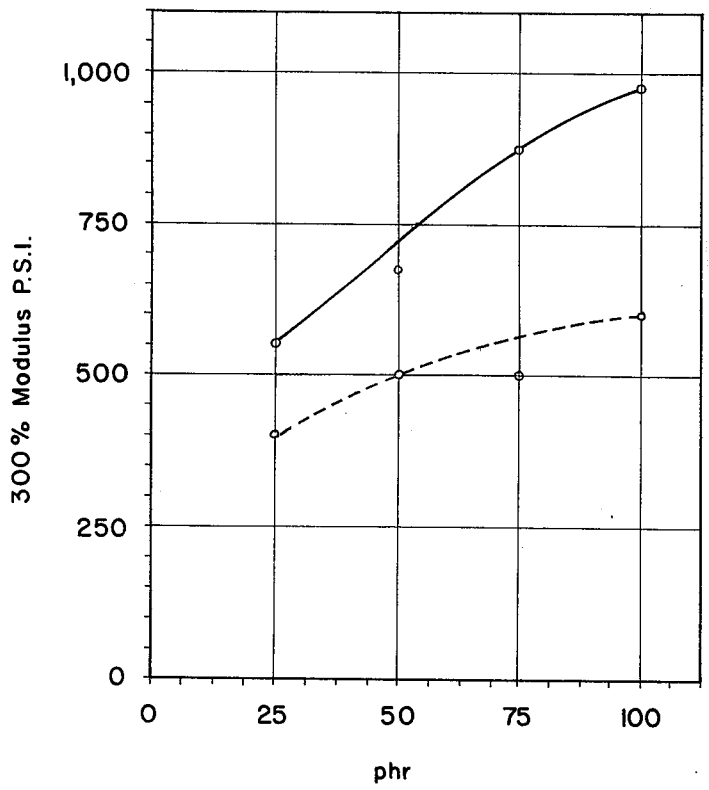
FIG. 2 is a graph of 300% modulus of the same clays as FIG. 1.
Figure 3:
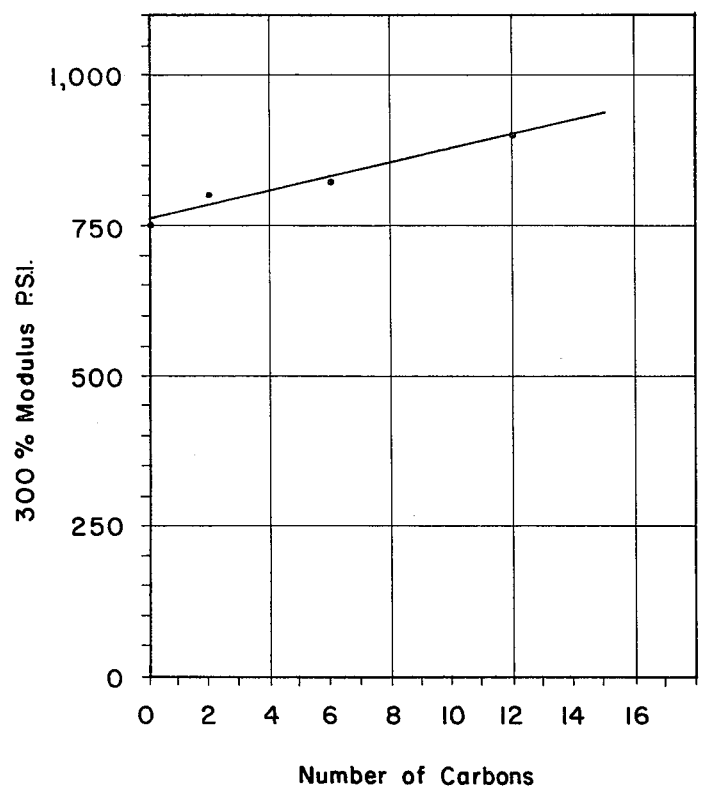
FIG. 3 is a graph of 300% modulus versus number of carbon atoms in the terminal amino fatty acids.

The drawings show clearly that there is a marked increase in 300% modulus in the clays treated according to this invention.

While we have illustrated and described certain preferred practices and embodiments of our invention in the foregoing specification, it will be understood that

We claim:

1. A white reinforcing pigment for elastomers comprising kaolin containing an organic acid having a functional group selected from the group consisting of -NH$_2$, -SO$_3$H and -SH.

2. A reinforcing pigment as claimed in claim 1 wherein the kaolin carries about 0.4% to 4% of said organic acid having functional groups selected from the group consisting of -NH$_2$, -SO$_3$H and -SH.

* * * * *